(12) United States Patent
Moore

(10) Patent No.: US 7,591,005 B1
(45) Date of Patent: Sep. 15, 2009

(54) METHOD AND APPARATUS FOR USER LOG-IN NAME MAPPING

(75) Inventor: Paul Moore, Mercer Island, WA (US)

(73) Assignee: Centrify Corporation, Mountain View, CA (US)

( * ) Notice: Subject to any disclaimer, the term of this patent is extended or adjusted under 35 U.S.C. 154(b) by 798 days.

(21) Appl. No.: 11/262,000

(22) Filed: Oct. 27, 2005

(51) Int. Cl.
*H04L 9/32* (2006.01)

(52) U.S. Cl. .................................. 726/2; 726/3; 726/4

(58) Field of Classification Search ................. 726/2–9, 726/16–17, 20–21; 713/182–183; 709/223–225
See application file for complete search history.

(56) References Cited

U.S. PATENT DOCUMENTS

| | | | | |
|---|---|---|---|---|
| 6,687,823 | B1 * | 2/2004 | Al-Salqan et al. | 713/167 |
| 7,167,874 | B2 * | 1/2007 | Shalabi et al. | 707/104.1 |

* cited by examiner

*Primary Examiner*—Hosuk Song
(74) *Attorney, Agent, or Firm*—Blakely, Sokoloff, Taylor & Zafman LLP

(57) ABSTRACT

A method of detecting when a user logs into a UNIX computer, of determining if the user's local log-in name should be replaced by a network log-in name for network authentication, of replacing the local log-in name if so determined, and of sending the log-in name with any other required authentication information to an authenticator so the user may be authenticated and allowed to log in to the computer. Other embodiments are also described.

8 Claims, 4 Drawing Sheets

| 220 | 230 |
|---|---|
| admin | admin_marlin |
| alex | alex.hsu |
| brent | brent.adams |
| linda | linda.burke |
| operator | operator_marlin |
| root | root_marlin |

Mapping Table
200
210

Figure 3

METHOD AND APPARATUS FOR USER LOG-IN NAME MAPPING

BRIEF DESCRIPTION OF THE INVENTION

Embodiments of this invention work with computers running UNIX (or a variation of UNIX) and an authenticator (such as a directory server) within a network of computers. An embodiment of the invention on each UNIX computer detects when a user logs in, checks the user's supplied local log-in name to see if it must be mapped to a new network log-in name and, if so, substitutes the network log-in name for the local log-in name when it authenticates the user in through the authenticator. This mapping may be used to ensure that the same local log-in name used on different UNIX computers will be authenticated using a different network log-in name during log-in on each computer.

BACKGROUND

The UNIX operating system requires a user to log in to a UNIX computer and be authenticated before being able to work on the computer. A user account associates a log-in name and password with each user. To avoid confusion among users, no two user accounts on the same system may have the same log-in name; each log-in name must be unique among the user accounts. The log-in name identifies the user account.

To log in and be successfully authenticated, the user must supply the log-in name and password associated with his user account. The UNIX operating system uses the log-in name to locate the correct user account and then completes authentication by checking the password supplied by the user.

A UNIX computer operating in isolation (i.e. not as part of a larger group or network of computers) stores user accounts internally. When a user logs into the stand-alone computer, the UNIX operating system looks through the computer's internal user accounts to find the log-in name and confirm the password supplied by the user. A log-in name used on a stand-alone computer need only be unique within the user accounts stored on that computer.

UNIX computers connected together in a network may allow a single user to log into many different computers on the network. User accounts for cross-network access are typically stored centrally in an authenticator such as a Lightweight Directory Access Protocol (LDAP) server or a Network Information Service (NIS) server. Each computer can send authentication requests to the authenticator. The authenticator uses the log-in name supplied in the authentication request to find a corresponding user account and confirm the password.

User accounts in an authenticator must each have a log-in name that is unique among the accounts stored in the authenticator. This ensures that each log-in name is associated with a single network user account.

A UNIX computer connected to a network may, during user log-in, authenticate users through either local user accounts stored within the computer or through network user accounts stored on an authenticator. The UNIX computer typically checks local accounts first and then—if the log-in name is not located in these accounts—checks network accounts. This allows local user accounts and network user accounts to co-exist, and allows identical log-in names to exist among the local, independent user accounts on each computer.

A UNIX computer traditionally has one or more locally defined user accounts for special log-ins. One of the most common is the local log-in name "root", used to specify a user account with special administrative privileges on the computer. A system administrator in charge of maintaining a computer logs in using the "root" log-in name and password defined in the local root user account stored in the computer.

To simplify user account management, many computer network administrators eliminate local user accounts on each UNIX computer and convert them to network user accounts on the authenticator. This conversion can cause log-in name conflicts when identically-named local accounts on different computers such as "root" are all converted to network accounts.

To avoid these conflicts, network administrators may modify each account name so that it is unique within the authenticator. For example, the log-in name "root" of a local root account on one computer may be modified to "root1" when converted to a network user account. The log-in name "root" of a local root account on another computer may be modified to "root2" when converted so that the two different root accounts do not have conflicting log-in names within the authenticator.

Converting local user accounts to centralized network accounts works well for consolidating all user accounts in an authenticator. Unfortunately it means there are no longer well-known standard log-in names on each UNIX computer. For example, a system administrator who wants to configure a set of UNIX computers whose local user accounts have been converted to network accounts can no longer log in as "root" to perform administrative duties on each computer. He must know a different converted root log-in name for each computer. These converted root log-in names may not be easy to remember or find.

SUMMARY OF THE INVENTION

Embodiments of this invention provide methods of accepting a common local log-in name on a UNIX host computer and converting it to a unique network log-in name used to identify a network user account on an authenticator.

An embodiment of this invention may run as a part of the user authentication system on a UNIX computer. It works with a mapping table, which contains a set of local log-in names that are each mapped to a network log-in name. The mapping table is may be stored as a file on the UNIX computer, but it may also be stored within a database or other data storage method, and it may be stored elsewhere on the network where the UNIX computer has access to it.

When a user supplies a log-in name to log into the computer, the embodiment looks for the supplied log-in name among the local log-in names in the mapping table. If it finds the supplied name, it retrieves the corresponding network log-in name from the mapping table and then uses that network name to authenticate the user through the authenticator. If it does not find the supplied name in the mapping table, it uses the supplied name without mapping to authenticate the user through the authenticator.

Mapping local log-in names to network log-in names allows a user to log into each UNIX computer in a network using a familiar, traditional local log-in name while being authenticated through the authenticator with a unique network log-in name. For example, an embodiment of the invention may authenticate a user logging in as "root" on one UNIX computer as the user "root1" in the authenticator. If a user logs in as "root" on a different UNIX computer, he may be authenticated as the user "root2" in the authenticator.

Name mapping also allows multiple local log-in names to map to the same network log-in name. For example, the local name "root" on a group of UNIX computers may be mapped in each computer to a single network name "rootmaster". This allows a single network user account "rootmaster" to specify authentication for the root accounts on the UNIX computers in the group.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 3 illustrates a mapping table used by one embodiment of the invention on a UNIX computer to identify local log-in names and substitute a network log-in name when appropriate.

DETAILED DESCRIPTION

This disclosure refers to UNIX processes and group data at several levels of abstraction. For precision and ease of reference, Applicant provides the following definitions, which will be used throughout the specification and in the claims.

UNIX is defined to be the UNIX operating system, a UNIX-like operating system, or variants of the UNIX operating system such as the Linux operating system or the Macintosh OS X operating system.

Local log-in name is defined as a user name used to log a user into a UNIX computer where the name is unique to a single user account within that computer, but not necessarily unique among log-in names provided by user accounts on other computers and components in an attached network.

Network log-in name is defined as a user name used to log a user into a UNIX computer on a network where the name is unique to a single user account in an authenticator that provides authentication services for the network.

Figure 1:
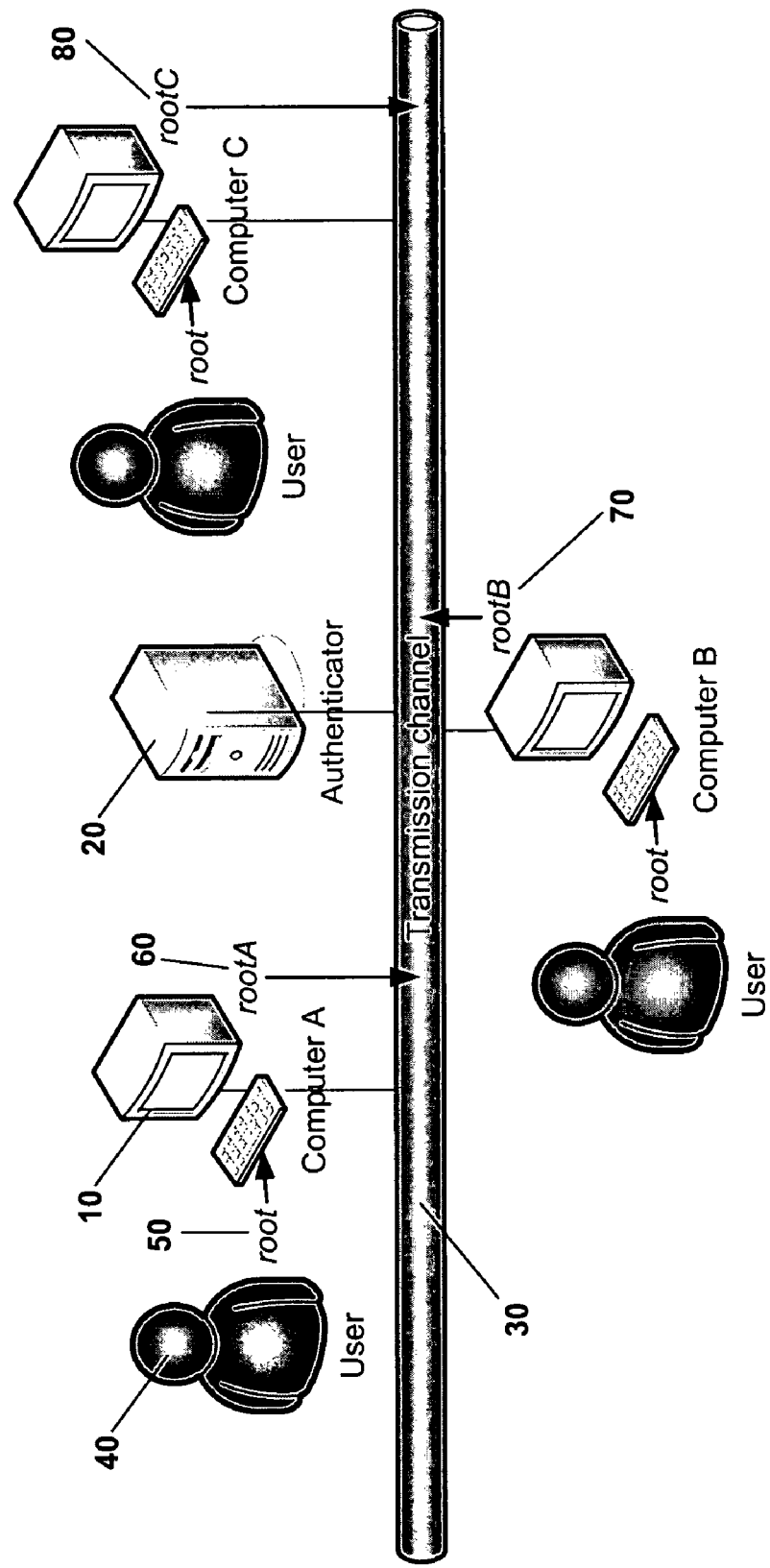
FIG. 1 illustrates how a user may log into different UNIX computers in a network using the same log-in name while being authenticated through an authenticator with a different log-in name for each computer in accordance with one embodiment of the invention.

FIG. 1 illustrates a UNIX computer (10) and an authenticator (20) that may be operated in accordance with an embodiment of the invention. The computer and authenticator are in communication through a transmission channel (30).

The authenticator (20) can use any authentication technology such as Microsoft's Active Directory, LDAP service, a relational database, or any other authentication technology. The authenticator can be a single server or a set of servers that supply unified authentication service to the network. The authenticator can provide authentication service to one or more computers.

The transmission channel (30) can be any wired or wireless transmission channel such as an Ethernet or Wi-Fi network.

A user (40) may log into a computer (10) on the network and enter a local log-in name (50) during the log-in process. In this example, the log-in name is "root". The computer determines whether the local log-in name should be replaced by a network log-in name (60) used for network-wide authentication, and then performs the replacement. In this example, Computer A replaces the local log-in name "root" with the network log-in name "rootA". The computer then sends the network log-in name along with other required authentication information (such as the password) to the authenticator (20).

When the same user attempts to log-in at Computer B using the log-in name "root", that computer determines that the local log-in name must be replaced, but this time with a different network log-in name, "rootB" (70) that reflects the fact that the "root" account on Computer B is a different network account than the "root" account on Computer A. Computer B transmits the network log-in name "rootB" to the authenticator for authentication.

A log-in attempt at Computer C using the same local log-in name "root" may result in authentication using the converted network log-in name "rootC" (80).

Figure 2:
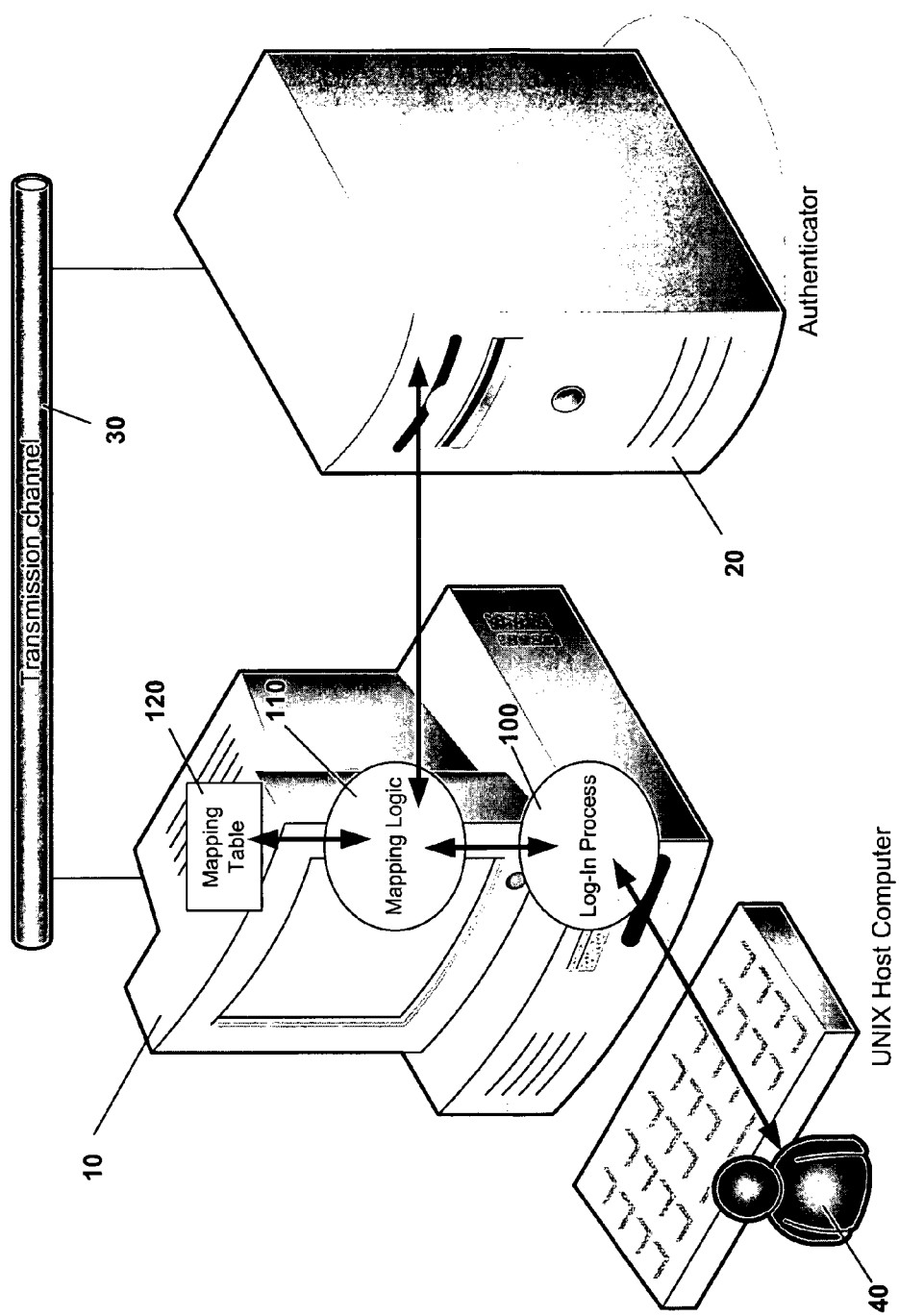
FIG. 2 illustrates a UNIX computer configured to map local log-in names to network log-in names in accordance with one embodiment of the invention.

FIG. 2 illustrates a UNIX computer (10) configured to operate in accordance with one embodiment of the invention. The computer provides a log-in process (100) that accepts log-in attempts from a user (40). In this embodiment, the log-in process is the standard UNIX log-in process which is enabled to use customizable Pluggable Authentication Module ("PAM") framework modules. The log-in process may be any other log-in process that accepts user log-ins and allows customization.

The computer contains custom mapping logic (110) that the log-in process executes whenever a user attempts to log in. In this embodiment, the mapping logic is a PAM module, but could be any other type of customization that may be executed by the log-in process.

When the log-in process (100) receives a local log-in name during a log-in attempt, it executes the mapping logic (110) and gives the local log-in name to the mapping logic. The mapping logic looks for the local log-in name in a mapping table (120) available in the computer. In this embodiment, the mapping table is a simple file stored in the computer, but it may also be implemented as a database table or any other form of accessible information. It may located directly on the computer, or it may be stored in a database on a different computer that is accessible via the network.

If the mapping logic (110) finds the local log-in name listed in the mapping table (120), it retrieves a corresponding network log-in name from the table and substitutes it for the local log-in name. The mapping logic then sends the authentication data, including the network log-in name, as an authentication request to the authenticator (20). It sends the request over the transmission channel (30).

When the authenticator (20) finishes processing the authentication data and sends a reply back to the mapping logic (110), the logic returns the results to the log-in process (100), which either accepts or denies the user's log-in attempt.

FIG. 3 illustrates a mapping table (200) used by one embodiment of the invention. The mapping logic reads this table, which is stored as a simple configuration file on the UNIX host computer. The table may also be stored using other methods and may be stored in other locations on a network where the UNIX host compute can read it.

The mapping table (200) may be a simple table with a set of two-part entries. Each entry (210) includes a local log-in name (220) that is associated with a network log-in name (230). Local log-in names must each be unique within the table. Network log-in names need not be unique within the table, so one or more local log-in names may be mapped to the same network log-in name.

The mapping logic reads the mapping table (200) to locate a supplied local log-in name. If it finds the local log-in name here, it retrieves the associated network log-in name for substitution.

Figure 4:
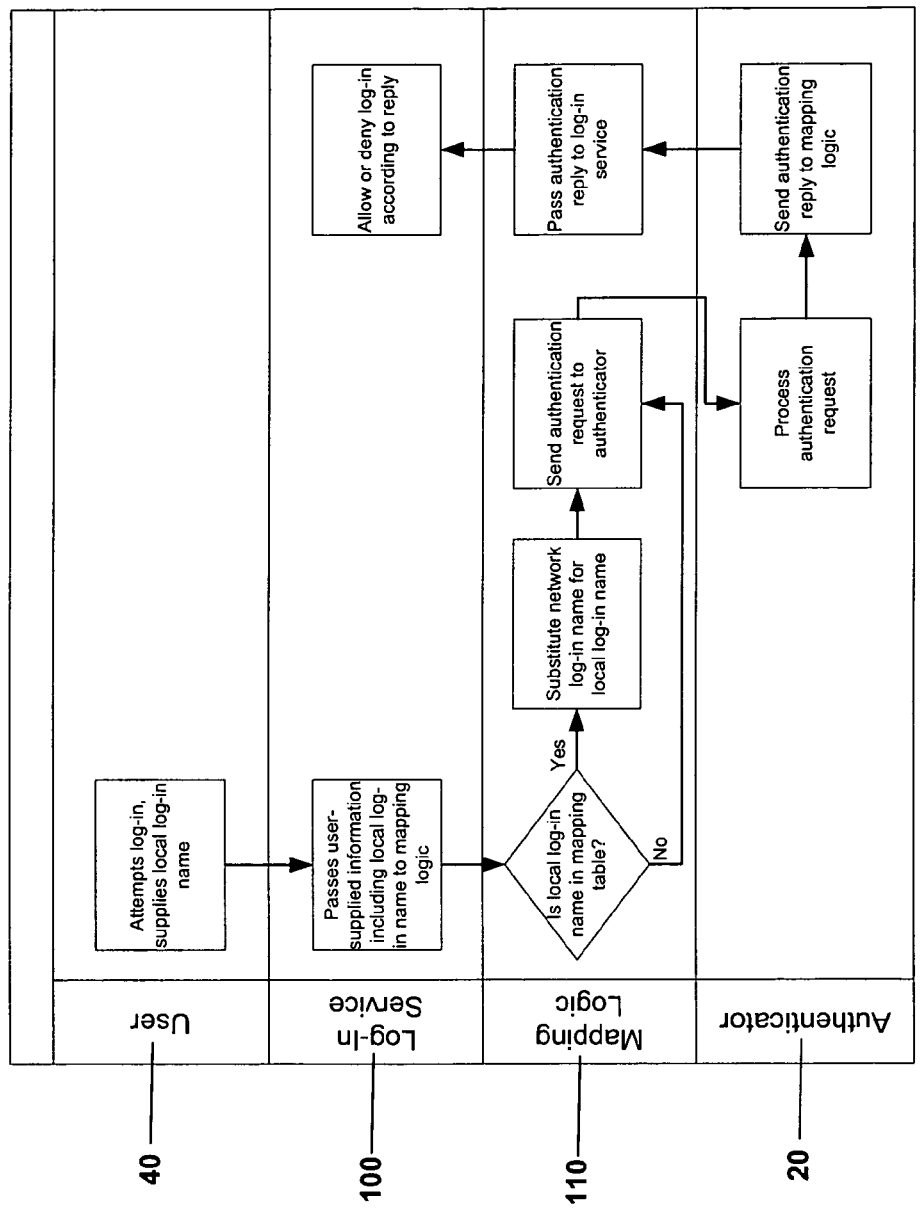
FIG. 4 illustrates the process that occurs when a user logs into a UNIX computer using a local log-in name that maps on the UNIX computer to a network log-in name in accordance with one embodiment of the invention.

FIG. 4 illustrates the process that occurs when a user (40) attempts to log in on a UNIX computer configured in accordance with one embodiment of the invention. The user enters his local log-in name, typically accompanied by a password used for authentication. The log-in service (100) on the UNIX computer accepts the user's local log-in name and password and any other authentication information that the user might supply, then passes that authentication information to the mapping logic (110).

The mapping logic (110) searches for the supplied local log-in name in the mapping table. If it finds the local log-in name there, it retrieves the associated network log-in name and substitutes it for the local log-in name. The mapping logic then sends the authentication information in an authentication request to the authenticator (20).

If the mapping logic (110) does not find the local log-in name in the mapping table, the module sends the authentication information unaltered in an authentication request to the authenticator (20).

The authenticator (20) processes the authentication request. It then sends to the mapping logic (110) a reply that approves or denies the authentication. The mapping logic passes the reply to the log-in service (100), which then allows the user to log in if the authentication was approved, or denies log-in to the user if the authentication was denied.

The foregoing description of specific embodiments of the present invention are presented for purposes of illustration and description. They are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), not limited to Compact Disc Read-Only Memory (CD-ROMs), Read-Only Memory (ROMs), Random Access Memory (RAM), Erasable Programmable Read-Only Memory (EPROM), and a transmission over the Internet.

I claim:

1. A computer-readable medium containing instructions that, when executed by a computing system, cause the system to perform operations comprising:

detecting when a user attempts to log into the computing system;

determining if a local log-in name supplied by the user should be replaced by a network log-in name used for network-wide authentication, wherein the determination comprises searching for the local log-in name in a mapping table, the mapping table being stored in a database on a second computing system that is accessible via a network;

replacing the local log-in name with the network log-in name if so determined; and sending the log-in name to an authenticator to authenticate the user for logging into the computing system.

2. The computer-readable medium of claim 1 wherein the instructions are arranged as a Pluggable Authentication Module ("PAM") framework module.

3. The computer-readable medium of claim 1 wherein the mapping table is stored in a local file on the computing system.

4. The computer-readable medium of claim 1 wherein the mapping table is stored in a database on the computing system.

5. A method comprising:

detecting when a user logs into a computing system;

determining if a local log-in name supplied by the user should be replaced by a network log-in name used for network-wide authentication, wherein the determination comprises reading a mapping table that links a plurality of local log-in names with a corresponding plurality of network-wide log-in names, the mapping table being stored in a database on a second computing system accessible via a network;

replacing the local log-in name with the network log-in name if so determined; and sending the network log-in name to an authenticator to authenticate the user for logging into the computing system.

6. The method of claim 5 wherein the determining operation is performed by a Pluggable Application Module of the computing system.

7. The method of claim 5 wherein the mapping table is stored in a local file on the computing system.

8. The method of claim 5 wherein the mapping table is stored in a database on the computing system.

* * * * *

UNITED STATES PATENT AND TRADEMARK OFFICE
CERTIFICATE OF CORRECTION

PATENT NO. : 7,591,005 B1 Page 1 of 1
APPLICATION NO. : 11/262000
DATED : September 15, 2009
INVENTOR(S) : Paul Moore It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 993 days.

Signed and Sealed this

Twenty-first Day of September, 2010

David J. Kappos
*Director of the United States Patent and Trademark Office*

US007591005C1

(12) INTER PARTES REEXAMINATION CERTIFICATE (1253rd)
United States Patent
Moore

(10) Number: US 7,591,005 C1
(45) Certificate Issued: Mar. 31, 2016

(54) METHOD AND APPARATUS FOR USER LOG-IN NAME MAPPING

(75) Inventor: Paul Moore, Mercer Island, WA (US)

(73) Assignee: CENTRIFY CORPORATION, Mountain View, CA (US)

Reexamination Request:
No. 95/001,434, Aug. 31, 2010

Reexamination Certificate for:
Patent No.: 7,591,005
Issued: Sep. 15, 2009
Appl. No.: 11/262,000
Filed: Oct. 27, 2005

Certificate of Correction issued Sep. 21, 2010

(51) Int. Cl.
*H04L 9/32* (2006.01)
*H04L 29/06* (2006.01)
*H04L 9/00* (2006.01)

(52) U.S. Cl.
CPC ........................................ *H04L 63/08* (2013.01)

(58) Field of Classification Search
CPC .................................. H04L 63/08; H04L 9/00

USPC ............................................................ 726/2
See application file for complete search history.

(56) References Cited

To view the complete listing of prior art documents cited during the proceeding for Reexamination Control Number 95/001,434, please refer to the USPTO's public Patent Application Information Retrieval (PAIR) system under the Display References tab.

*Primary Examiner* — Sam Rimell

(57) ABSTRACT

A method of detecting when a user logs into a UNIX computer, of determining if the user's local log-in name should be replaced by a network log-in name for network authentication, of replacing the local log-in name if so determined, and of sending the log-in name with any other required authentication information to an authenticator so the user may be authenticated and allowed to log in to the computer. Other embodiments are also described.

At the time of issuance and publication of this certificate, the patent remains subject to pending reissue application number 15/008,374 filed Jan. 27, 2016. The claim content of the patent may be subsequently revised if a reissue patent is issued from the reissue application.

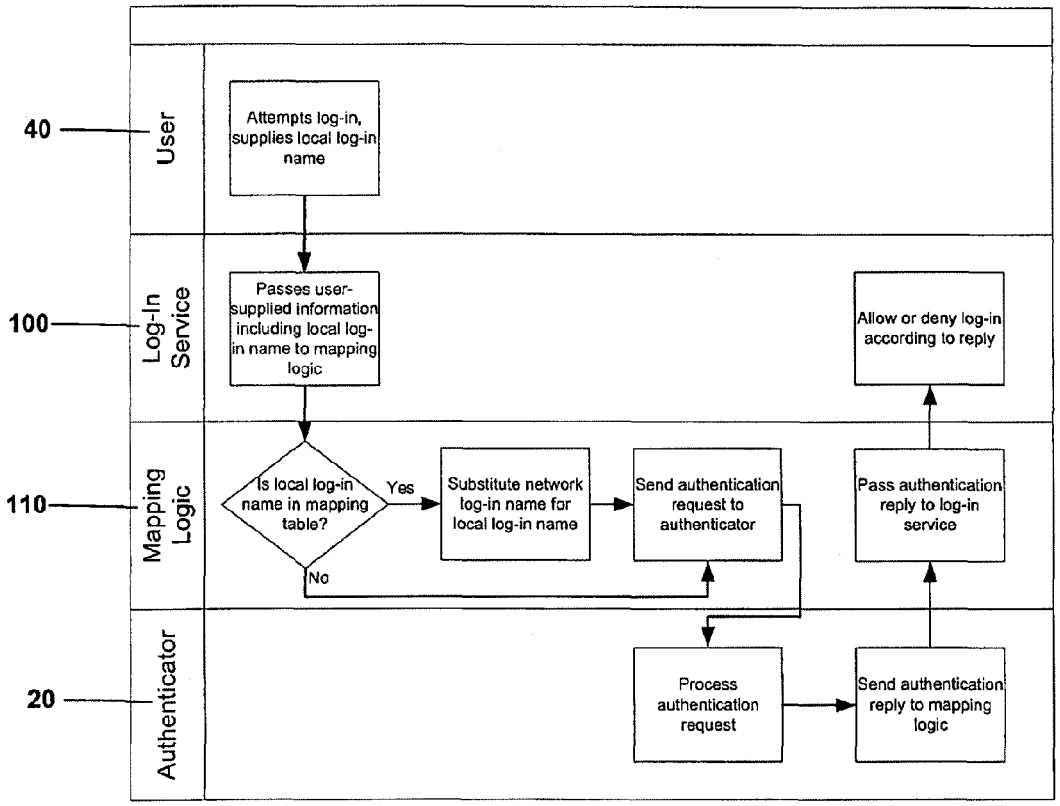

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-8 are cancelled.

\* \* \* \* \*